UNITED STATES PATENT OFFICE.

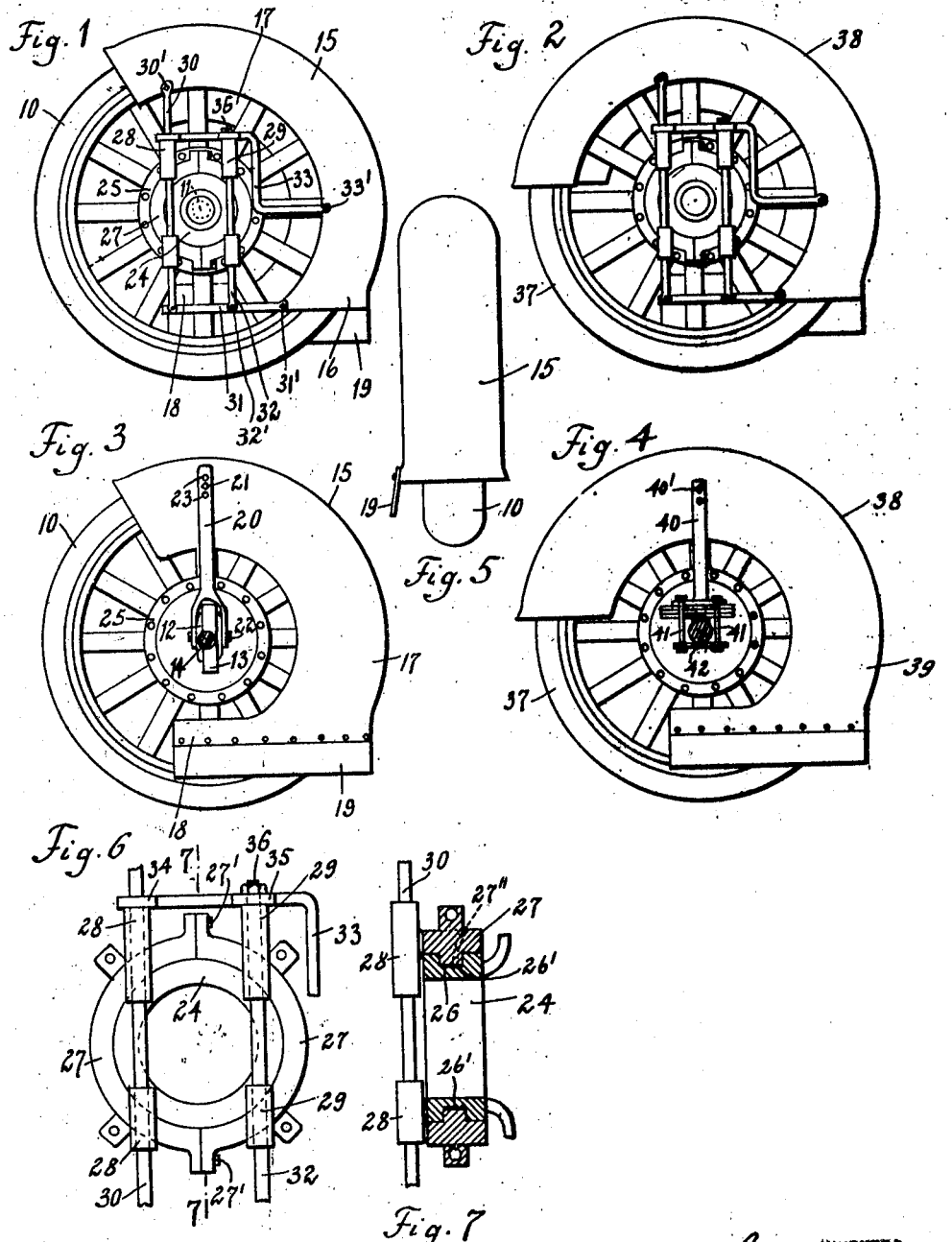

JOHN BLASZCZYK, OF NEW YORK, N. Y.

MUD-GUARD.

980,051.  Specification of Letters Patent.  Patented Dec. 27, 1910.

Application filed March 28, 1910. Serial No. 551,859.

*To all whom it may concern:*

Be it known that I, JOHN BLASZCZYK, a subject of the Czar of Russia, and a resident of the city of New York, in the county of Kings and State of New York, have invented certain new and useful Improvements in Mud-Guards, of which the following is a specification.

The present invention relates to an attachment for motor vehicles known as the "mud guard", to protect persons riding in the vehicle from mud and water thrown outwardly by the centrifugal action from the front and rear wheels.

As far as known, the mud guard is usually attached to the body of the vehicle and, since the front wheels of the vehicle are necessarily arranged in such a manner that their position relative to the longitudinal axis of the vehicle must be varied in steering, it is obvious that the mud guard must be arranged a substantial distance above the periphery of the wheel, and cannot cover the side of the wheel. It will be observed that thus mud and water is splashed sideward upon the passersby and the frame of the vehicle; in other words the mud guards heretofore in use serve only to protect the persons occupying the car.

It is now the object of the present invention to provide a mud guard for motor vehicles, and t1e like, obviating the serious defects of the constructions heretofore in use.

With this and other objects in view, which will appear as the nature of the invention is better understood, the same consists in the novel construction, arrangement and combination of parts hereinafter fully described, pointed out in the appended claims and illustrated in the accompanying drawings, it being understood that many changes may be made in the form, size, arrangement and construction of the parts without departing from the spirit or sacrificing any of the advantages of the invention, which is illustrated in the accompanying drawings, in which:—

Figures 1 and 2 are side elevations of the front and rear wheels, respectively, with the improved mud guard in place thereon; Figs. 3 and 4 are side elevations of said wheels and their axles and mud guards of the sides opposite to that shown in Figs. 1 and 2; Fig. 5 is a rear elevation of the device shown in Figs. 1 and 3; Fig. 6 is a front elevation of a detail of construction; and Fig. 7 is a section taken on line 7, 7 of Fig. 6.

In the drawings, the numeral 10 designates one of the front wheels of the vehicle, which is mounted in the usual manner upon the spindle 11, fixedly attached to the pivot pin 12, the latter being rotatably mounted in the forked end 13 of the front axle 14.

The mud guard is indicated at 15, and comprises a, preferably, sheet metal member arranged concentrically with the periphery of the wheel, the front side 16 and the rear side 17 being bent inwardly toward the center of the wheel, preventing thus the water and mud from being thrown sideward. The rear side 17 extends farther inward than the front side 16 and protects thus effectively the vehicle frame and body. The rear side 17 of the mud guard is provided with a substantially horizontal extension 18, to which is attached a downwardly depending resilient sheet 19, preferably of rubber, for still further protection of the vehicle.

The mud guard is connected upon the rear and front sides with the spindle 11 of the wheel, so that it will be shifted with the latter as the vehicle is steered. The connection upon the rear side of the mud guard comprises a brace 20, which is attached by means of a screw bolt 21, or other suitable fastening means, to the mud guard, and by bolts 22, 22 to the pivot pin 12. The brace is provided with a row of holes 23, to be engaged by the screw bolt 21 and allowing thus of an adjustment of the mud guard relative to the center of the wheel. The connection upon the front side of the wheel comprises a ring 24, which is attached to the hub ring 25 of the wheel and extends sideward, encircling the hub of the wheel, and being provided with an annular groove 26. In this groove is seated a supporting ring 27, made preferably of two halves, united by screw bolts 27' or other fastening means. This supporting ring carries a plurality of sleeves, for instance in the case illustrated two pairs 28, 28 and 29, 29. These sleeves may be fixedly attached to or made integral with the supporting ring halves 27, 27; each ring half carrying two of the same in line with each other. The sleeves 28, 28 are engaged by a rod 30 passing through the same, and being detachably fastened at its upper end at 30' to the front side 16 of the guard and at its lower end to a brace 31, which is detachably mounted at 31' upon the guard and runs in a substantially horizontal line toward and beyond the center of the wheel. The sleeves 29 are in a similar manner engaged by a rod 32, the lower end of which is attached at 32' to the brace 31, while its upper end engages a brace 33, detachably secured at 33' to the guard. The brace 33 is provided with enlarged portions 34 and 35, having holes therein in engagement with the rods 32 and 30. To keep the brace in engagement with the rod 32, the upper end of this rod is screw threaded and meshes with a nut 36.

In order to lubricate the annular contacting surface between the rings 24 and 27, oil grooves 26' are provided in the groove 26, to which lead oil holes 27'', in communication with a supply of lubricating material.

Referring now more particularly to Figs. 2 and 4, the numeral 37 denotes one of the rear wheels of the vehicle, provided with a mud guard 38, similar in construction to that illustrated in Figs. 1 and 3, with the exception that the former extends over almost three-fourths of the periphery of the wheel and is provided upon its rear face 39 with a brace 40, attached by means of the spring-clips 41, 41 to the rear axle 42, and by a bolt 40' to the guard. The means arranged upon the front side of the wheel for connecting the guard with the axle are substantially the same as the one described in connection with the front wheel.

In use, first, the ring 24 is attached to the hub ring 25. The supporting ring halves 27 are then seated in the groove 26 of the ring 24, the rods 30 and 32 engaged with the sleeves 28 and 29, respectively, the braces 31 and 33 brought into engagement with and attached to the rods, whereupon the guard is fastened to the rod 30 and the braces 31 and 33, and finally the brace upon the rear side of the wheel attached to the pivot pin 12 or the axle 42, as the case may be.

If it is desired to remove the guard from the wheel in order to repair or clean the same, only the screw bolt 21 or 40' is disengaged with the braces upon the rear side of the wheel, and the separable fastenings 30', 33' and 31' loosened, whereby the guard can be taken off the wheel.

What I claim is:

1. In a mud guard for vehicle wheels, the combination with an axle, of a wheel rotatably mounted thereon, a concentric plate member for covering part of the periphery of said wheel and extending at both sides inward toward the center thereof, a brace attached at one end to one side of said member and at its other end to said axle, a ring fastened to the hub of said wheel provided with a groove, a supporting ring seated in said groove and carrying a plurality of substantially vertical sleeves, rods engaging said sleeves, and braces attached to the other side of said plate member and to said rods.

2. In a mud guard for vehicle wheels, the combination with an axle, of a wheel rotatably mounted thereon, a concentric plate member for covering part of the periphery of said wheel and extending at both sides inward toward the center thereof, a brace attached at one end to one side of said member and at its other end to said axle, a ring fastened to the hub of said wheel provided with a groove, a supporting ring seated in said groove and carrying a plurality of substantially vertical sleeves, rods engaging said sleeves, and braces detachably attached to the other side of said plate member and to said rods.

3. In a mud guard for vehicle wheels, the combination with an axle, of a wheel rotatably mounted thereon, a concentric plate member for covering part of the periphery of said wheel and extending at both sides inward toward the center thereof, a brace adjustably attached at one end to one side of said member and at its other end to said axle, a ring fastened to the hub of said wheel provided with a groove, a supporting ring seated in said groove and carrying a plurality of substantially vertical sleeves, rods engaging said sleeves, and braces attached to the other side of said plate member and to said rods.

4. In a mud guard for vehicle wheels, the combination with an axle, of a wheel rotatably mounted thereon, a concentric plate member for covering part of the periphery of said wheel and extending at both sides inward toward the center thereof, a brace adjustably attached at one end to one side of said member and at its other end to said axle, a ring fastened to the hub of said wheel provided with a groove, a supporting ring seated in said groove and carrying a plurality of substantially vertical sleeves, rods engaging said sleeves, and braces detachably attached to the other side of said plate member and to said rods.

Signed at New York, in the county of New York and State of New York, this 12th day of March, A. D. 1910.

JOHN BLASZCZYK.

Witnesses:
GOTTLIEB HRON,
SIGMUND HERZOG.